Jan. 9, 1940.   J. B. FELDMAN   2,186,408
APPARATUS FOR DETERMINING THE MINIMUM LIGHT VISIBLE
Filed March 26, 1937   3 Sheets-Sheet 1

Inventor:
Jacob B. Feldman,
By J. T. Wobensmith 2nd
Attorney

Jan. 9, 1940.   J. B. FELDMAN   2,186,408
APPARATUS FOR DETERMINING THE MINIMUM LIGHT VISIBLE
Filed March 26, 1937   3 Sheets-Sheet 2

Inventor:
Jacob B. Feldman
By Z. T. Wobensmith 2nd
Attorney.

Jan. 9, 1940.　　　　J. B. FELDMAN　　　　2,186,408
APPARATUS FOR DETERMINING THE MINIMUM LIGHT VISIBLE
Filed March 26, 1937　　　3 Sheets-Sheet 3
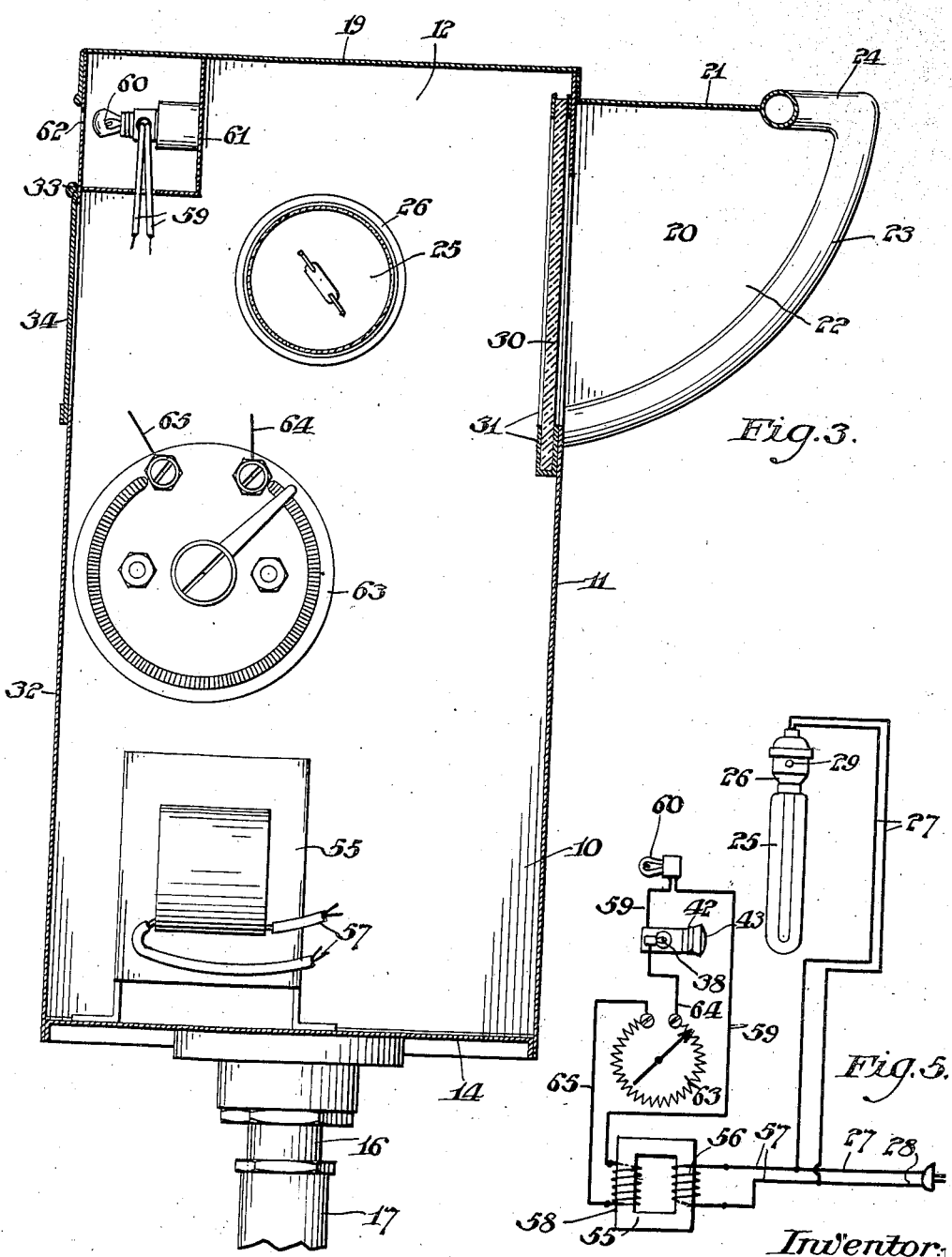
Inventor:
Jacob B. Feldman,
By J. T. Wobensmith
Attorney.

Patented Jan. 9, 1940

2,186,408

UNITED STATES PATENT OFFICE 2,186,408

APPARATUS FOR DETERMINING THE MINIMUM LIGHT VISIBLE

Jacob B. Feldman, Philadelphia, Pa.

Application March 26, 1937, Serial No. 133,175

6 Claims. (Cl. 88—20)

This invention relates to apparatus for determining the minimum light visible and for ascertaining the presence or absence of the normal minimum light threshold of the person tested. The invention relates more particularly to an instrument of this character which will be simple in construction, reliable in operation and which will overcome numerous difficulties heretofore encountered.

Efforts have heretofore been made to study dark adaptation as evidence of the sensitivity of various retinal elements of the eye, and to determine thereby the existence of pathological conditions requiring treatment. The instruments heretofore proposed are, however, relatively complex, have not generally proven reliable in practice, do not permit of an objective approach with respect to the person being tested, are not free from possibilities of error on the part of the patient or person being tested, or do not within themselves prevent the occurrence of error or deception by the person being tested.

Dark adaptation is the progressively increasing sensitivity of the eye to light in a totally dark room. The smallest amount of light that is visible to the dark adapted eye is called the light minimum, the minimum light visible or the light threshold. In order to determine the dark adaptation, it is essential that the eye be conditioned by exposure to a light source of sufficient intensity for a sufficient period of time to permit of the eye becoming light adapted. After this light adaptation has been effected the source of light is removed, the person being tested is maintained in absolute darkness for a predetermined interval and thereafter it is ascertained whether or not the person can observe a light of predetermined character and small measured intensity. The character and intensity of this light which should be observable after the passage of a predetermined interval of time has been ascertained for normal persons.

If the person under test is unable to observe any light from this small source within a predetermined time interval the person under test can not be considered as normal and may be studied further for the purpose of treatment. It has been ascertained by tests that if no sensitivity to light is observable within a relatively short period of time, of the order of approximately nine minutes, there is very little possibility of the person under test having any sense of light, or any approach to a normal light threshold at any time thereafter.

It is highly desirable that persons not having a normal dark adaptation be excluded from certain occupations or from positions of responsibility where a normal dark adaptation is essential to the safety of the person tested as well as other persons.

It is an object of the present invention, therefore to provide a suitable apparatus for determining dark adaptation which will overcome the difficulties heretofore encountered.

It is a further object of the present invention to provide an instrument for determining dark adaptation which can be operated by relatively unskilled persons.

It is a further object of the present invention to provide an instrument for providing for both light and dark adaptation.

It is a further object of the present invention to provide an instrument which will readily provide suitable information as to the capabilities with respect to dark adaptation of individuals employed in occupations where a normal standard of dark adaptation is essential.

It is a further object of the invention to provide an instrument for determining dark adaptation which will be inherently free from error or deceptive attempts on the part of the person tested.

It is a further object of the invention to provide an instrument for determining dark adaptation with which the determinations may be obtained quickly and easily.

Other objects of the invention will appear from the annexed specification and claims.

The nature and characteristic features of the invention will be more readily understood from the following description, taken in connection with the accompanying drawings forming part hereof, in which:

Fig. 3 is a vertical sectional view of the apparatus taken approximately on the line 3—3 of Fig. 4;

Fig. 4 is a top plan view of the apparatus shown in Fig. 1, with the top cover removed; and Fig. 5 is a diagrammatic view of the wiring diagram and electrical connections of the apparatus of the present invention.

Figure 1:
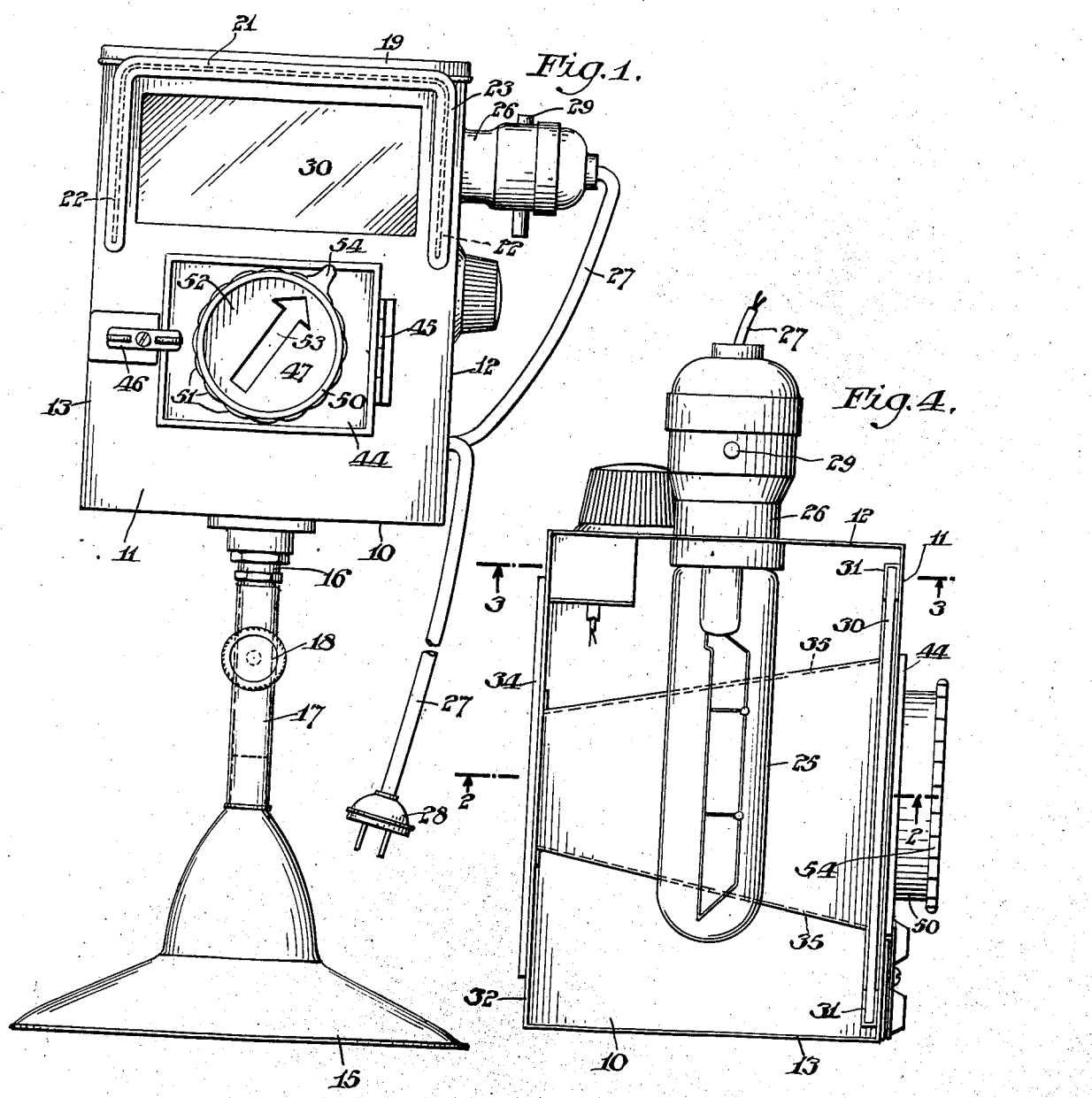
Figure 1 is a front elevational view of a preferred embodiment of the apparatus of the present invention.
Figure 2:
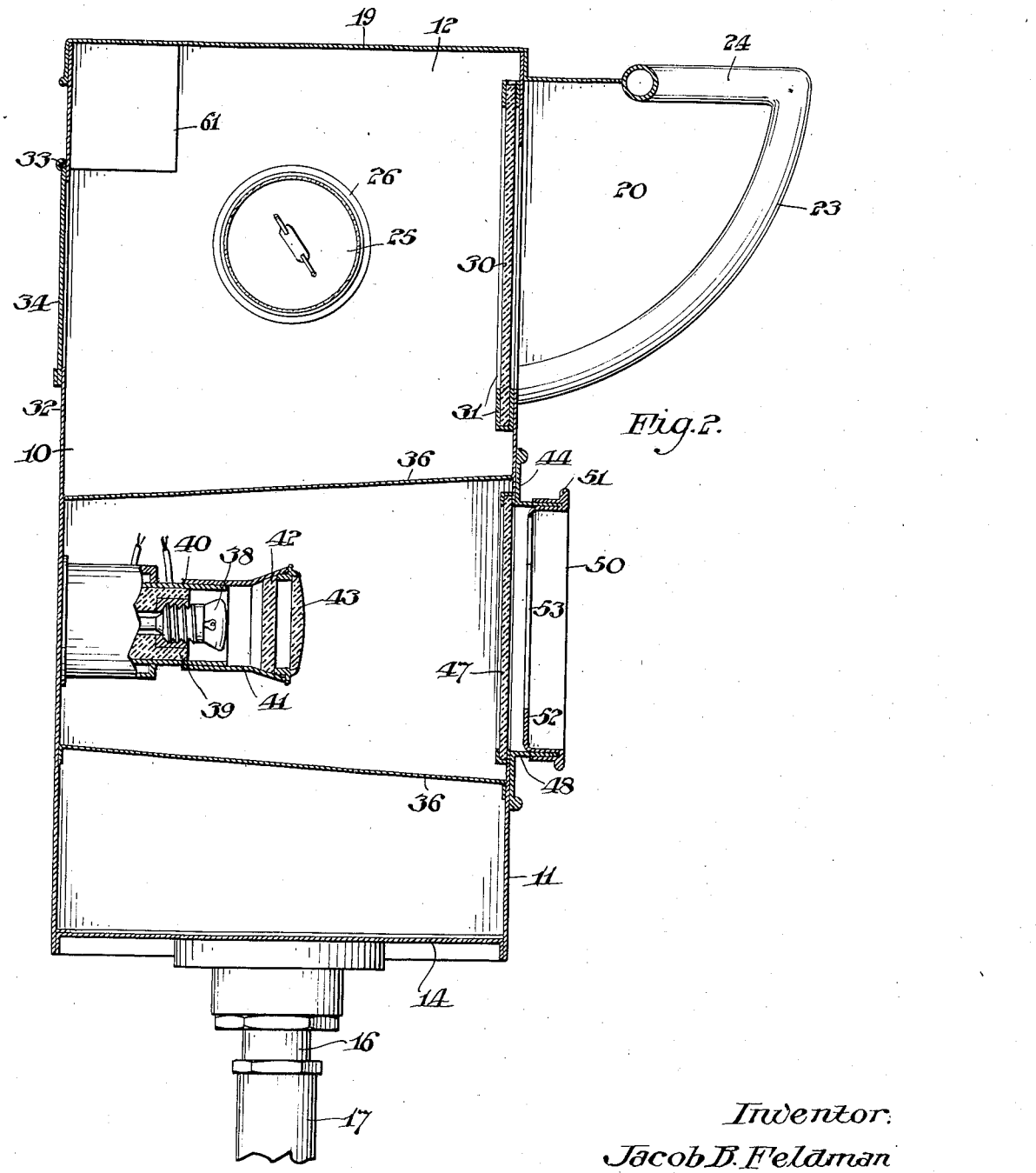
Fig. 2 is a vertical central sectional view of the apparatus shown in Fig. 1 taken approximately on the line 2—2 of Fig. 4.

It will, of course, be understood that the description and drawings herein contained are illustrative merely, and that various modifications and changes may be made in the structure disclosed without departing from the spirit of the invention.

Referring more particularly to the drawings in which a preferred embodiment of the invention is illustrated, it will be seen that there is provided for the instrument a casing 10 which may be of sheet metal, wood or any other suitable material. The casing 10 includes a front wall 11, side walls 12 and 13, and a bottom wall 14. The casing 10 is preferably supported above a suitable base 15 and provision is made for adjusting the vertical position of the casing 10 to suit the person being tested. The structure illustrated for providing for suitable height adjustment comprises a rod 16 suitably secured to the bottom wall 14 of the casing 10 and telescoping within a tube 17 extending upwardly from the base 15, an adjusting screw 18 being provided for securing the rod 16 in the desired position of horizontal adjustment.

A cover 19 is provided on the casing 10 and may have mounted thereon a hood 20, consisting of a top plate 21, side plates 22, and a tubular rubber edge portion 23, and the hood 20 may be shaped as at 24 to conform to the forehead.

A field for obtaining light adaptation of the person to be tested is provided and preferably includes a suitable source of light of sufficient strength and intensity to provide for complete light adaptation within a period of from two to five minutes as may be found desirable under usual conditions. A 40 watt incandescent lamp, as at 25, has been found suitable for this purpose, where the time period stated is used, although if a shorter period of time is desired a 100 watt lamp may be used, this lamp being mounted in a socket 26 secured to the side wall 12 of the casing 10 and from which an electrical cord 27 extends as shown to a suitable plug 28 for insertion in a socket (not shown) of a conventional 110–115 volt electric light circuit.

A switch 29 of any desired type is preferably provided in this circuit so that the lamp 25 may be extinguished when desired, and after light adaptation of the person being tested has been effected. Provision is made for dispersion of the light from the incandescent bulb 25 and preferably takes the form of a piece of flashed or frosted glass 30 mounted on the front wall 11 of the casing 10 in any desired manner, channels 31 being suitable for this purpose.

The rear wall 32 of the casing 10 may have pivotally mounted thereon, as by means of a hinge 33, a door 34 which may be opened for ventilating the interior of the casing 10, while the incandescent bulb 25 is lighted.

A second light source and an associated optical system are also provided within the casing 10 for determining the minimum light visible of the person to be tested. Side walls 35 and top and bottom walls 36, extending from the rear wall 32 to the front wall 11 of the casing 10, are provided for separating this portion of the instrument from the light adaptation source.

The system for ascertaining minimum light visible which forms part of the instrument, as will be evident, must have the characteristic of reliability, including relative freedom from fluctuation due to changes in the voltage of the circuit to which the instrument is connected and freedom from changes in intensity due to other causes, the characteristic of freedom from possibility of error, and the characteristic of reproducibility.

The system for ascertaining the minimum light visible preferably includes a small incandescent lamp 38 of low voltage, preferably about 2.3 volts. The lamp 38 is selected for its reliability, matured in order to maintain a substantially constant output of light during its useful life, and must provide a light output of predetermined or determinable quantity. This lamp 38 is mounted in a suitable socket 39 secured to the rear wall 32 of the casing 10, which socket 39 has a tube 40 extending forwardly therefrom. The quantity of light at the forward edge of the tube 40 is of the order of three quarters of a foot candle.

A tube 41 telescoped and frictionally held on the tube 40 likewise extends forwardly and has provided therein a daylight filter 42 which rectifies the light transmitted from the lamp 38 so as to provide a true white light which is comparable to the average north sky. The daylight filter 42 may have one face thereof ground or frosted to cause a divergence or spreading of the light rays from the incandescent lamp 38.

In front of the daylight filter 42 a lens 43 is preferably provided for spreading the rays of light emanating from the lamp 38. The characteristics of the lens 43 may be varied but a 20-diopter spherical lens has been found satisfactory. The filter 42 and the lens 43 are preferably of a character such that substantially no change is made in the intensity of the light from the lamp 38.

The front wall 11 of the casing 10 has mounted thereon a door 44, a hinge 45 being provided at one edge of the door 44, and a latch 46 being provided at the other edge of the door 44 for holding the door in closed position. The door 44 permits access to the interior of the space within the walls 35 and 36.

On the rear side of the door 44 a neutral filter 47 is mounted, this filter 47 having the absorptive capacity desired in accordance with the strength of the lamp 38 but preferably permits only a very small quantity of the light from the lamp 38 to pass therethrough. It has been found in practice that a filter 47 permitting approximately 1 to 2% of the light to pass therethrough is satisfactory.

On the front side of the door 44 a flat ring 48 is mounted upon which a cap 50 is carried for rotation on the ring 48. The cap 50 is frictionally held on the ring 48. The cap 50 has an outer serrated edge 51 for engagement by the fingers of the operator. At the inner side of the cap 50 there is provided a flat plate 52 having a cutout portion as at 53. The cutout portion 53 is preferably made in the form of an arrow, which, by reason of the construction and mounting of the cap 50, may be turned so as to point in any desired direction in a vertical plane. An additional projection 54 at the edge of the cap 50 is provided for indicating to the operator the direction in which the arrow points.

As hereinafter more fully referred to, the light from the lamp 38 after passing through the daylight filter 42, the lens 43 and the neutral filter 47 may be observable through the cutout portion 53.

Current for the lamp 38 is preferably supplied to the socket 39 from a transformer 55 mounted within the bottom portion of the casing 10 adjacent the side wall 12. The use of a transformer 55 and a low voltage for the lamp 38 renders substantially negligible the effect of line voltage fluctuation on the output of the lamp 38. The primary 56 of the transformer 55 is connected as by means of wires 57 to the wires 27.

The lamp 38 is connected to the secondary 58 of the transformer 55 by a wire 59 and there is preferably provided, in series with the lamp, a small indicating lamp 60 contained within a box 61 in the upper part of the casing 10. The indicating lamp 60 is preferably red in color, and in alinement with a small aperture 62 in the rear wall 32 of the casing 10. The indicating lamp 60 permits of the operator ascertaining whether the lamp 38 is functioning and whether the proper amount of current is being supplied therethrough.

In series in the circuit which includes the lamp 38, a current control device 63 is also provided, it being desirable that this device 63 have the characteristic of being substantially noiseless in its operation so that the person being tested is not advised as to whether or not the lamp 38 is lighted. A wire 64 connects this device 63 with the lamp 38 and another wire 65 is connected to the secondary 58 of the transformer 55.

A rheostat may be employed for this purpose and used either in "full on" or "off" positions, although the variation in the quantity of light emanation from the source 38 being thus susceptible to control, if desired, a neutral filter of different absorptive capacity or a plurality of different neutral filters may be used in place of the filter 47 heretofore referred to.

The method of using the instrument for ascertaining the minimum light visible and thereby the presence or absence of a normal light threshold of a person to be tested will now be pointed out.

The person to be tested is preferably seated facing toward the exterior of the front wall 11 of the instrument, which will appear as shown in Fig. 1. The room is darkened to a condition of absolute darkness and the lamp 25 is lighted by actuation of the switch 29. The person being tested is directed to look at the glass plate 30 which is illuminated by the lamp 25, and is required to continue looking at the plate 30 for a period of approximately two to five minutes, as desired, which period has been found sufficient to obtain a condition of light adaptation. The lamp 25 is then extinguished by means of the switch 29.

The operator may then, when he desires, and preferably before the lamp 25 is extinguished, supply current to the lamp 38, by means of the control device 63, meanwhile observing through the aperture 62 which is out of the range of vision of the person being tested that the current is so turned on.

A very small quantity of light is supplied from the lamp 38, passes through the daylight filter 42, the lens 43, and the neutral filter 47 and illuminates the neutral filter 47. The quantity or intensity of the light thus supplied is measured and determined, as pointed out above, and the color quality of the light is also made certain by means of the daylight filter 42.

The operator may turn the cap 50 by grasping the serrated portion 51 with the fingers so that the arrow points in any preferred direction, this being done without the person being tested having any knowledge as to the direction thus indicated.

After the lamp 25 is extinguished, a period of several minutes will elapse during which the person being tested will be passing from the light adapted condition to the dark adapted state and whether normal or not this period will pass before the person being tested will be able to see any light through the cutout portion 53.

The period of time elapsing, between the turning out of the lamp 25 and that at which the person being tested has the ability to see the very small quantity of light passing to him through the cutout portion 53 is indicative either of normal dark adapation or of a departure from normal dark adaptation if an excessive length of time is required.

A check upon the accuracy of the statement of the person being tested is provided by requiring that person to indicate the direction toward which the arrow points, this position being determined by the operator as aforesaid, or by a repetition of the same operations with the arrow in a different position.

I claim:

1. In a device for testing eyes, a housing divided into two separate chambers, light diffusing viewing screen means on a common side of each of said chambers for transmitting diffused light from the respective chambers, a light of relatively high intensity in one of said chambers cooperating with the light diffusing viewing screen of said chamber to produce a field of high intensity diffused light adapted to be viewed by the eyes under test for light adaptation, a source of relatively low intensity illumination in the other of said chambers cooperating with the diffusing screen of said chamber to produce light of controlled low intensity in the field of vision of the eyes which is adapted to be viewed after viewing said high intensity field of diffused light, means for turning off the high intensity source of illumination after being viewed by said eyes and means rotatably supported in cooperative relation with said light diffusing screen of said relatively low intensity source of illumination having characteristics for producing in effect a light diffusing form character which may be rotated to different directions and which is adapted to be distinguished by the eyes when recovering from said high intensity light adaptation.

2. In a device for testing eyes, a housing divided into two separate chambers, light diffusing viewing screen means on a common side of each of said chambers for transmitting diffused light from the respective chambers, a light of relatively high intensity in one of said chambers cooperating with the light diffusing viewing screen of said chamber to produce a field of high intensity diffused light adapted to be viewed by the eyes under test for light adaptation, a source of relatively low intensity illumination in the other of said chambers cooperating with the diffusing screen of said chamber to produce light of controlled low intensity in the field of vision of the eyes which is adapted to be viewed after viewing said high intensity field of diffused light, means for turning off the high intensity source of illumination after being viewed by said eyes and means fitting over and rotatably supported in cooperative relation with said light diffusing screen of said relatively low intensity source of illumination having an opening therein of a given shape for producing an illuminated field throughout the area of said opening of given form character which may be rotated to different directions and which is adapted to be distinguished by the eyes when recovering from said high intensity light adaptation.

3. In a device for testing eyes, a housing divided into two separate chambers, a relatively high intensity source of illumination in one of said chambers, a relatively low intensity source of illumination in the other of said chambers, a light diffusing viewing screen of a relatively large area on one side of said chamber having the high intensity source of illuminatoin therein for producing a field of high intensity diffused light adapted to be viewed by the eyes under test for light adaptation, a relatively small circular light diffusing screen on the side of the chamber having the low intensity source of illumination therein towards the eyes under test, a cup-like cap member fitting over said relatively small circular light diffusing screen having an opening of a shape producing a form character through which the low intensity diffused light from said chamber is adapted to pass, said cup-like member being mounted so that it may be rotated to position the form character in different directions and means for shutting off the high intensity source of illumination after being viewed by said eyes whereby the eyes are adapted to distinguish the low intensity form character when recovering from said high intensity light adaptation.

4. In a device for testing eyes, a housing divided into two separate chambers, light diffusing viewing screen means on a common side of each of said chambers for transmitting diffused light from the respective chambers, a light of relatively high intensity in one of said chambers cooperating with the light diffusing viewing screen of said chamber to produce a field of high intensity diffused light adapted to be viewed by the eyes under test for light adaptation, a source of relatively low intensity illumination in the other of said chambers cooperating with the diffusing screen of said chamber to produce light of controlled low intensity in the field of vision of the eyes which is adapted to be viewed after viewing said high intensity field of diffused light, means for turning off the high intensity source of illumination after being viewed by said eyes, means rotatably supported in cooperative relation with said light diffusing screen of said relatively low intensity source of illumination having characteristics for producing in effect a light diffusing form character which may be rotated to different directions and which is adapted to be distinguished by the eyes when recovering from said high intensity light adaptation, and means for fixing the low intensity source of illumination to a desired controlled intensity.

5. In a device for testing eyes, a housing divided into two separate chambers, light diffusing viewing screen means on a common side of each of said chambers for transmitting diffused light from the respective chambers, a light of relatively high intensity in one of said chambers cooperating with the light diffusing viewing screen of said chamber to produce a field of high intensity diffused light adapted to be viewed by the eyes under test for light adaptation, a source of relatively low intensity illumination in the other of said chambers cooperating with the diffusing screen of said chamber to produce light of controlled low intensity in the field of vision of the eyes which is adapted to be viewed after viewing said high intensity field of diffused light, means for turning off the high intensity source of illumination after being viewed by said eyes, means rotatably supported in cooperative relation with said light diffusing screen of said relatively low intensity source of illumination having characteristics for producing in effect a light diffusing form character which may be rotated to different directions and which is adapted to be distinguished by the eyes when recovering from said high intensity light adaptation, and a visor-like shield fitting about the upper portion of the high intensity light diffusing viewing screen.

6. In a device for testing eyes, the combination of a base having a tubular upright thereon, a housing having a bar-like member telescoped within said tubular upright, means for locking the bar-like member and tubular upright in different adjusted relations with each other to vary the height of the housing, said housing being divided into two separate chambers, light diffusing viewing screen means on a common side of each of said chambers for transmitting diffused light from the respective chambers, a light of relatively high intensity in one of said chambers cooperating with the light diffusing viewing screen of said chamber to produce a field of high intensity diffused light adapted to be viewed by the eyes under test for light adaptation, a source of relatively low intensity illumination in the other of said chambers cooperating with the diffusing screen of said chamber to produce light of controlled low intensity in the field of vision of the eyes which is adapted to be viewed after viewing said high intensity field of diffused light, means for turning off the high intensity source of illumination after being viewed by said eyes and means rotatably supported in cooperative relation with said light diffusing screen of said relatively low intensity source of illumination having characteristics for producing in effect a light diffusing form character which may be rotated to different directions and which is adapted to be distinguished by the eyes when recovering from said high intensity light adaptation.

JACOB B. FELDMAN.